W. Heerdt,

Extension Table,

Nº 20,489. Patented June 8, 1858.

UNITED STATES PATENT OFFICE.

W. HEERDT, OF NEW YORK, N. Y.

EXTENSION-TABLE.

Specification of Letters Patent No. 20,489, dated June 8, 1858.

*To all whom it may concern:*

Be it known that I, WILLIAM HEERDT, of the city, county, and State of New York, have invented a new and useful Improvement in Extension-Tables; and I do hereby declare that the following is a full, clear, and exact description of the same, reference being had to the annexed drawings, making a part of this specification, in which—

Figure 3:
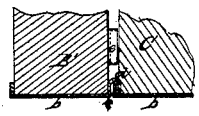
Figure 1:
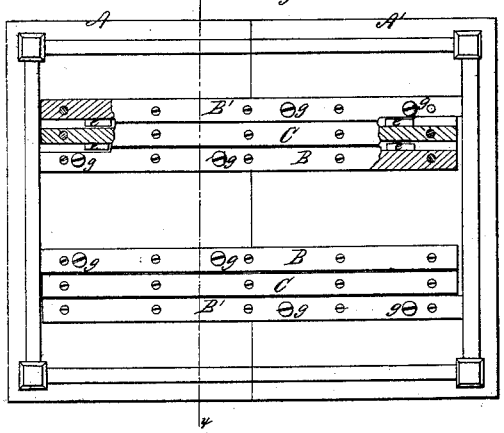
Figure 2:
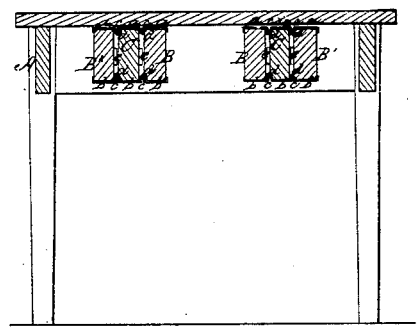
Figure 4:
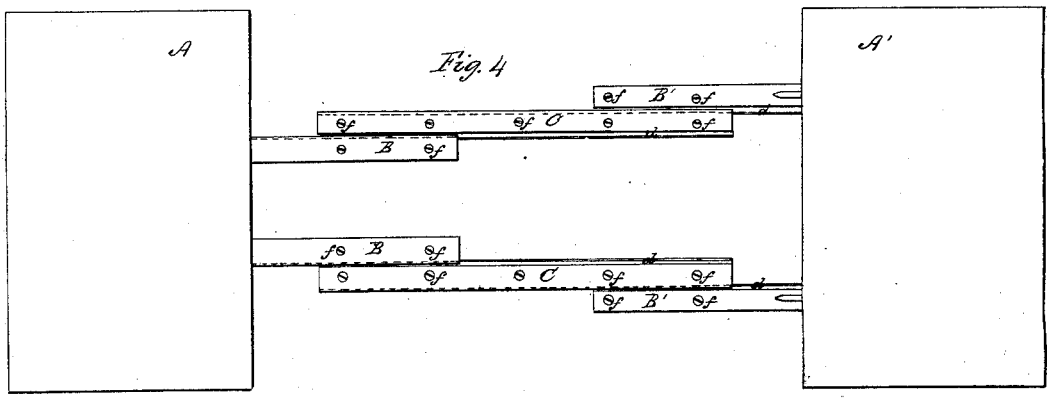

Figure 1, is an inverted plan view of an extension table constructed according to my invention. Fig. 2, is a transverse vertical section of the same taken in the line $x$, $x$, Fig. 1. Fig. 3, is an enlarged transverse section of two of the slides. Fig. 4, is a plan or top view of the same.

Similar letters of reference indicate corresponding parts in the several figures.

This invention relates to an improvement in the slides or guide bars of the table as hereinafter fully shown and described, whereby the slides or guide rods are not only firmly connected with each other, but are also allowed to slide freely past each other so that the table may be readily folded and extended and still be kept perfectly firm in either position or state.

To enable those skilled in the art to fully understand and construct my invention I will proceed to describe it.

A, A′, represent the two parts of the table. These parts are constructed in the usual way, and supported by legs or pedestals, the two parts being of equal size. These parts may be constructed in any of the known ways, and a particular description of them is not necessary.

To the under side of the upper surface of each part A, A′, two slides or guide bars B, B, B′, B′, are attached, two to each, as shown clearly in Figs. 1 and 4. These slides or guide bars B, B, are attached to the part A, considerably nearer together than the bars B′, B′, of the part A′, so that a sufficient space will be allowed between said bars to receive bars C, which form a connection between the bars B, B, B′, B′, as shown clearly in Fig. 4.

The slide or guide bars B, B′, C, are constructed of wood, but they have metal plates $a$, $b$, attached to their upper and bottom surfaces, as shown clearly in Fig. 2, the plate $a$, being on the upper and the plate $b$, at the lower surfaces of the bars. The metal plates $a$, $b$, connect the several bars together as shown clearly in Figs. 2 and 3,—the plates projecting beyond the sides of the bars and having a ledge $c$, at one side, and a groove $d$, at the other, so arranged that the ledge $c$, of one bar will fit in the groove of the plate of an adjoining bar. This arrangement is precisely the same at both the upper and lower surfaces of the bars, and will be clearly understood by referring to Figs. 2 and 3.

The bars C, form the connection between the bars B, B′, and the plates $a$, $b$, are so arranged that while they connect the slides or guide bars B, B′, C, firmly together they will allow them to slide freely, so that the two parts A, A′, may be closed directly in contact with each other forming a compact table, or, be extended by drawing out the two parts A, A′, nearly the length of the intermediate bars C, or as far as stops $e$, see Figs. 1, 2 and 3, will permit.

The plates $a$, $b$, may be constructed of steel or thick sheet metal, swaged into proper form, and they may be secured to the slides or bars by screws $f$. The bars being secured to the upper surfaces of their respective parts A, A′, by screws $g$, see Fig. 1.

By this improvement the two parts of the table may be readily closed or extended as the metal plates $a$, $b$, will prevent the slides or guide bars from warping, and as the metal plates $a$, $b$, are only in contact, the slides or guide bars cannot be affected by swelling or shrinking as is the case where slides are constructed wholly of wood.

My improvement may be cheaply constructed and applied, and any number of slides may be used according to the length of extension required.

I do not claim broadly the employment or use of metal plates in the construction of slides or guides for extension tables, for they have been previously used, although so far as I am aware not in connection with wooden bars; but,

Having thus described my invention, what I claim as new and desire to secure by Letters Patent, is,

The metal plates $a$, $b$, attached to the upper and lower surfaces of the bars B, B′, C, swaged or so formed as to be provided with ledges and grooves $c$, $d$, which fit one into the other, the whole being arranged as and for the purpose set forth.

WM. HEERDT.

Witnesses:
  H. BRANTIGAM,
  B. H. MAHNKOPF.